United States Patent [19]

Brockhurst et al.

[11] Patent Number: 4,611,227
[45] Date of Patent: Sep. 9, 1986

[54] DECODER FOR DIGITAL INFORMATION T.V. SIGNAL

[75] Inventors: David M. Brockhurst, Winchester; Roy H. Vivian, Andover; Martyn R. Dyer, Romsey; Stephen Day, Winchester, all of United Kingdom

[73] Assignee: Independent Broadcasting Authority, London, England

[21] Appl. No.: 448,986
[22] PCT Filed: Mar. 19, 1982
[86] PCT No.: PCT/GB82/00089
§ 371 Date: Nov. 22, 1982
§ 102(e) Date: Nov. 22, 1982
[87] PCT Pub. No.: WO82/03290
PCT Pub. Date: Sep. 30, 1982

[30] Foreign Application Priority Data

Mar. 20, 1981 [GB] United Kingdom ............... 8108822

[51] Int. Cl.⁴ .................... H04N 7/087; H04N 7/08
[52] U.S. Cl. ................... 358/147; 358/141; 358/142; 358/146; 340/723; 340/728
[58] Field of Search ............ 358/141, 142, 146, 147; 340/723, 728

[56] References Cited

U.S. PATENT DOCUMENTS

| | | | |
|---|---|---|---|
| 3,969,716 | 7/1976 | Roberts | 340/728 |
| 4,085,443 | 4/1978 | Dubois et al. | 364/900 |
| 4,161,729 | 7/1979 | Insam | 358/147 |
| 4,308,558 | 12/1981 | Hernandez et al. | 358/147 |
| 4,388,645 | 6/1983 | Cox et al. | 358/147 |
| 4,393,404 | 7/1983 | Cox et al. | 358/147 |
| 4,429,385 | 1/1984 | Cichelli et al. | 358/146 |

FOREIGN PATENT DOCUMENTS 2269270 11/1975 France .

OTHER PUBLICATIONS

AFIPS Conference Proceedings, May 1981, by Rocchetti, "Vision II: A Dynamic Raster-Scandisplay", pp. 671-676.
Computer Design, vol. 18, No. 10, Oct. 1979, by Hughes, "Videotex and Teletext Systems", pp. 10-23.
NHK Laboratories Note, No. 249, Mar. 1980, by Fujiwara, "A Versatile Editing Equipment for Japanese Teletext", pp. 1-9.
ANT Abstract of New Technology, NTN 77/0255, 1977 (May), by McDonough, "Automatic Digitizing System".
The SERT Journal, vol. 11, Oct. 1977, by Insam et al., "An Integrated Teletext and Viewdata Receiver", pp. 210-213.
Wireless World, Nov. 1978 by Hinton, "Character Rounding for the Wireless World Teletext Decoder", pp. 49-53.
Inspec, GEC Journal of Science and Technology, vol. 41, No. 4, 1974, by Biggs et al., "Broadcast Data in Television", pp. 117-124.
Texas Instruments, Application Report B183, by Norris et al., "The TIFAX XM II Teletext Decoder", pp. 1-20.
IEEE Transactions on Consumer Electronics, vol. CE-26, No. 3, Aug. 1980, (New York, U.S.), pp. 605-614, by Bown et al., "Comparative Terminal Realizations with Alpha-Geometric Coding".
Consumer Electronics, vol. CE-22, No. 3, Aug. 1976 by Norris et al., "Teletext Data Decoding-The LSI Approach", pp. 247-252.

Primary Examiner—James J. Groody
Assistant Examiner—Michael D. Parker
Attorney, Agent, or Firm—Laubscher & Laubscher

[57] ABSTRACT

A television receiver is provided with a decoder (32) for decoding and displaying data which is included in a wide band video signal. In order to provide high resolution graphics, a processor (45) is connected to a data page store (41) of the decoder (32) and a program store (47). Instructions for the processor (45) are received 'off air' and are stored in the store (41). The instructions are executed using programs stored in the store (47). A clock circuit (45a) is provided for the processor (45) to enable delays and other timed sequences to be introduced and a rounding circuit (46a) ensures as smooth an output display as possible. Data can additionally be received from another soce via a telephone line and selected for display in place of the 'off air' data.

10 Claims, 11 Drawing Figures

TABLE 1

HRG COMMANDS AND ASSOCIATED ARGUMENTS

| COMMAND NUMBER | NAME | ARGUMENTS | | | | | | | | | NUMBER OF BITS | TOTAL | TOTAL + LEAD IN |
|---|---|---|---|---|---|---|---|---|---|---|---|---|---|
| 0 | LINE | C | $X_1$ | $Y_1$ | $X_2$ | $Y_2$ | | | | | 5+4+11+10+11+10 | 51 | 56 |
| 1 | CIRCLE | C | $X_1$ | $Y_1$ | R | | | | | | 5+4+11+10+11 | 41 | 46 |
| 2 | BOUNDARY | C | $X_1$ | $Y_1$ | | | | | | | 5+4+11+10 | 30 | 35 |
| 3 | INFILL | C | $X_1$ | $Y_1$ | | | | | | | 5+4+11+10 | 30 | 35 |
| 4 | POLYGON | C | $X_1$ | $Y_1$ | $X_2$ | $Y_2$ | --- | $X_n$ | $Y_n$ | $*-1$ | 5+4+11+10+11+10+----+11+10+11* | | |
| 5 | ERASE | C | | | | | | | | | 5+4 | 9 | 14 |
| 6 | DELAY | T | | | | | | | | | 5+4 | 9 | 14 |
| 7 | WRITE | C | $X_1$ | $Y_1$ | T | E | X | T | $*X'1B$ | | 5+4+11+10+8+8+----+8+8* | | |
| 8 | DOUBLE HEIGHT WRITE | C | $X_1$ | $Y_1$ | T | E | X | T | $*X'1B$ | | 5+4+11+10+8+8+----+8+8* | | |
| 9 | CHAIN | C | $X_1$ | $Y_1$ | MOVE 1 | MOVE 2 | --- | MOVE N-1 | MOVE N | | 5+4+11+10+4+4+----+4+4 | | |
| A | CHARACTER DEFINITION i) 10×8 | ASCII CODE | ROW 1 | ROW 2 | --- | ROW 10 | | | | | 5+8+8+8+----+8 | 93 | 98 |
|  | ii) 20×16 | ASCII CODE | ROW 1 | ROW 2 | --- | ROW 20 | | | | | 5+8+16+16+----+16 | 333 | 338 |
| B | DOUBLE HT & WIDTH WRITE | C | $X_1$ | $Y_1$ | T | E | X | T | $*X'1B$ | | 5+4+11+10+8+8+----+8+8* | | |

| | | | | | |
|---|---|---|---|---|---|
| C MAJOR ARC | C | X₁ Y₁ X₂ Y₂ R | 5+4+11+10+11+10+11 | 62 | 67 |
| D MINOR ARC | C | X₁ Y₁ X₂ Y₂ R | 5+4+11+10+11+10+11 | 62 | 67 |
| E PROGRAM END | | | 5 | 5 | 10 |
| F COLOUR PALETTE | C | RED \| GREEN \| BLUE | 5+4+7+7+7 | 30 | 35 |
| 10 RESET TO STANDARD COLOUR PALETTE | | | 5 | 5 | 10 |
| 11 FLASH ON | T | | 5+4 | 9 | 14 |
| 12 FLASH OFF | | | 5 | 5 | 10 |
| 13 DISPLAY NEAT PLANE | | | 5 | 5 | 10 |
| 14 ACQUIRE LEVEL 3 DRCS | | | 5 | 5 | 10 |

\*ARE DELIMETERS:—

'WRITE' COMMANDS [NO 7, 8, 8]: ASCII CODE FOR ESCAPE 1B.

'POLYGON' COMMAND [NO 4]: X COORDINATE OF −0·5 [≡7FF]

'CHAIN' COMMAND [NO 9]: MOVE (n) = − MOVE(n−1) i.e. BACK TRACKS

C ≡ COLOUR

T ≡ TIME

DECODER FOR DIGITAL INFORMATION T.V. SIGNAL

STATEMENT OF THE INVENTION

The present invention relates to television systems and more particularly to a method of apparatus for decoding digital information processed for inclusion in a wide band T.V. video signal.

BRIEF DESCRIPTION OF THE PRIOR ART

In any normal television system, the transmission of the wide band video signals which are to produce the actual picture elements on the screen of the receiver is interrupted between the scannning periods for line and field synchronization purposes. Consequently, there are periods during which no video signals are being transmitted. It is now possible to use these periods for the transmission of data which is not necessarily concerned with the video transmission itself.

Basically, data representable by standard symbols such as alpha-numeric symbols can be transmitted via a restricted channel provided that the rate of transmission is restricted. It is now possible to use periods as aforesaid especially the line times of the field blanking intervals (i.e. the times of the individual lines occurring between fields which correspond with the times occupied by video signals on active picture lines), for the transmission of pages of data. Typically, using 8-bit digital signals representing alpha-numeric characters (7 bits of data plus 1 bit for protection) at a bit rate of 2.5M bit per second, 50 pages of data each consisting of 22 strips of 40 characters can be transmitted repeatedly in a total cycle time of 90 seconds using only a single line of the field blanking period per field of the 625 lines system as operated in the United Kingdom.

Data transmission as described above is already commercially available in the United Kingdom under the name "Teletext", and transmitters and receivers are described in more detail in our U.K. Pat. Nos. 1,486,771; 1,486,772; 1,486,773 and 1,486,774.

Existing teletext displays consist of 40 characters per row and 24 rows per page. The U.K. teletext transmission standard specifies a data rate of 6.9375 Mbits per second (which has proven to be at the upper reasonable limit of transmission rate for system I, B/G system) so as just to achieve transmission of a complete row of text on one video line of the field blanking time.

The advantage of conveying one row of text on one video line is to achieve maximum economy in requirements for transmission of addressing information needed to correctly position the text information on the displayed page. Since whole rows of text are transmitted on each line, only a row number need be transmitted with each data line of text. Row zero which acts as the page demarcation signal requires additional page numbering information and also incorporates various display and interpretation codes appropriate to the particular page. In order to facilitate parallel magazine working every row of text also incorporates a 3-bit magazine number, being the most significant digit of the page number.

The above structure incorporating as it does one text row on every data line thus results in a very efficient utilization of the transmission facility. However, the existing Teletext transmissions do have limitations in so far as they are less satisfactory when in a "graphics" mode as compared with an "alpha-numeric" mode.

SUMMARY OF THE INVENTION

An object of the present invention is to provide a system of digital transmission which will produce improved pictures when in the "graphics" mode while being compatible with existing U.K. Teletext transmissions. The type of graphics in which we are interested is usually termed alpha-geometrics but in this specification is called high resolution graphics (HRG).

The present invention provides a television receiver system having a parallel binary memory device, an input for receiving a demodulated television signal carrying, during picture-free periods thereof, a set of pages of information represented by serial binary signals provided in a repeated cycle, the form of which is such that the binary signals for the set of pages are received in groups, which groups are received each in a different one of said periods and the whole of the information for the set of pages is received during each occurrence of the cycle, selector means responsive to page address codes present in the cycle for selecting a page from a set of pages and causing the binary signals of the selected page to be stored in the memory device, and a signal generator for providing signals for visual display by an intensity modulated raster, characterized in that the binary signals represent coded instructions and in that processing means is provided for controlling operation of the system, and a further storage device is provided for storing a plurality of routines each of which is arranged to cause the processing means to operate in accordance with a received instruction whereby to cause the desired information to be displayed.

In a preferred form, the picture to be displayed is notionally divided into a number of vertical and horizontal locations hereinafter termed "pixels" and these pixels are utilized rather than the character locations as in existing Teletext. Thus the coded instructions relate to pixels rather than to character locations. The pixels are preferably square.

BRIEF DESCRIPTION OF THE DRAWING

In order that the present invention be more readily understood, an embodiment thereof will now be described by way of example with reference to the accompanying drawings, in which:

FIGS. 8A and 8B constitute a Table showing the commands and the bits required for defining the useful number of options.

DETAILED DESCRIPTION

As was mentioned above, a conventional Teletext data transmission will transmit the data required for forty characters in the line period of the broad band television signal. Thus, with 8-bit words being transmitted, it is possible to transmit 8×40 bits of information in each line time of the field blanking interval. This is done in the present system for improved graphics.

Figure 1:
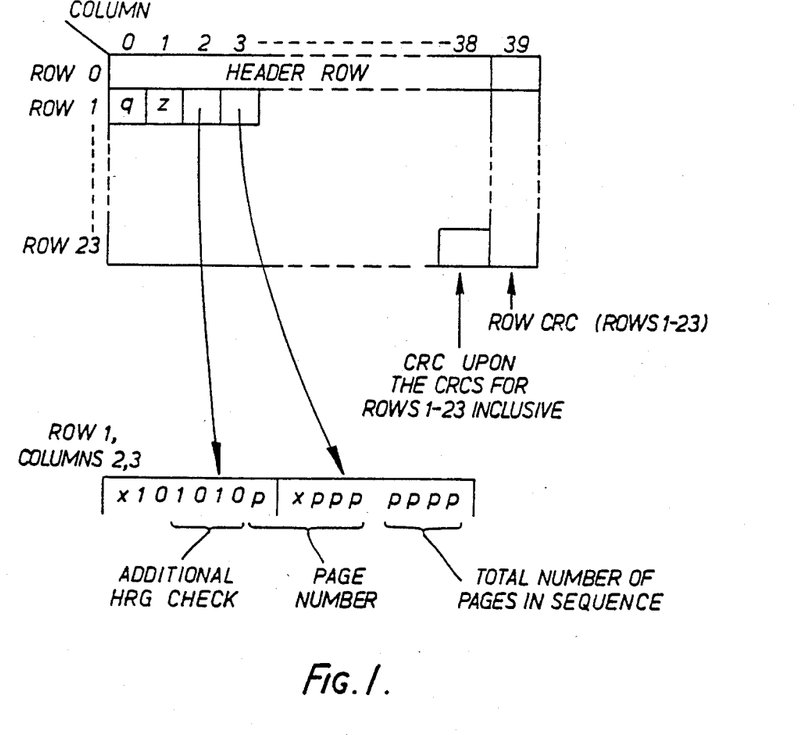
FIG. 1 shows the construction of data as it would be assembled if it were displayed.

It is conventional to send a page header as the first row of information. With the present system it is necessary to send a code identifying the fact that the new system is being used so that the decoder can take the appropriate action. The code can be a range of page numbers not included in or recognizable to conventional teletext or an additional code. If an additional code is used, it can be included in the data for the header or it can, as shown in FIG. 1, occupy the first two eight bit locations of the second row of data transmitted. The additional code can be any code sequence which will identify the new system and the codes used in conventional Teletext for the letters q and Z have been chosen because it is considered unlikely that this particular combination will ever appear in practice. Following this additional code, a further 8-bits of information are provided for telling the new system how much information to expect in terms of pages of transmitted data. Thus, the first 4-bits will indicate the actual page number while the second 4-bits indicate the total number of pages to expect. If necessary an additional lead-in code can be provided before the page data in order to provide an additional check.

Figure 2:
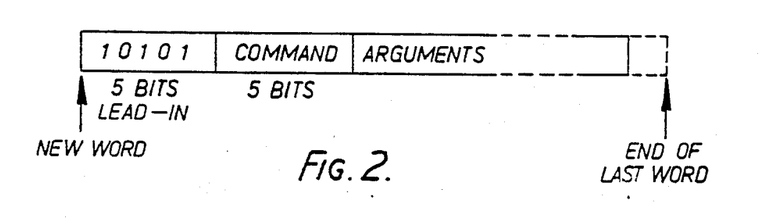
FIG. 2 shows the construction of a typical data word to be transmitted using the new system.

The system of the present invention provides data words of variable length rather than of fixed length of 8-bits and each of the new data words consists of a lead-in section, a command section and an argument section as shown in FIG. 2. These new data words will be called HRG words. However, the lead-in section always consists of the same sequence and number of bits, in this case a 5-bit sequence 10101. The command section is a further sequence of bits whose number determines the total number of commands available. In this case, 5 bits are used to give up to 32 commands. The length of the argument is variable and is either implicit in the command or ends with a known delimiter.

Although the length of the HRG words is variable it is convenient to continue to utilize the 8-bit word recognition facility of the conventional teletext decoder to provide timing of the start of each HRG word. Thus, it is convenient to have each HRG word commence at the beginning of an 8-bit location in a row of data.

The last 8-bits on each row of transmitted data for rows 1 to 23 inclusive contain a CRC code. It is convenient to provide an additional CRC code as the penultimate 8-bits on row 23 so as to check the CRC codes on the preceding rows. This arrangement means that execution of the commands has to wait until a page of information has been received by the decoder. This, however, is not necessary but it does provide the presently preferred mode of operating the system.

Turning now to the decoder and its mode of operation, rather than transmitting the data required to enable the display to produce the desired display for each character location on each row, the present system is arranged to have a processor for producing the required signals for display under the control of the HRG words transmitted. Further, the system enables the selection of any point i.e. any pixel of the desired display to be the starting point because each starting point is defined in the argument of each HRG word. Thus, the HRG words are akin to a program being transmitted to the processor of the decoder. There are preferably 320 pixels across the display (horizontally) and 240 pixels vertically. Alternatively, for even better definition there could be 640 horizontally and 480 vertically. The exact number of pixels is not important as long as the numbers involved are multiples of 40 horizontally and 24 vertically if it is desired to maintain compatibility with existing Teletext.

Figure 3:
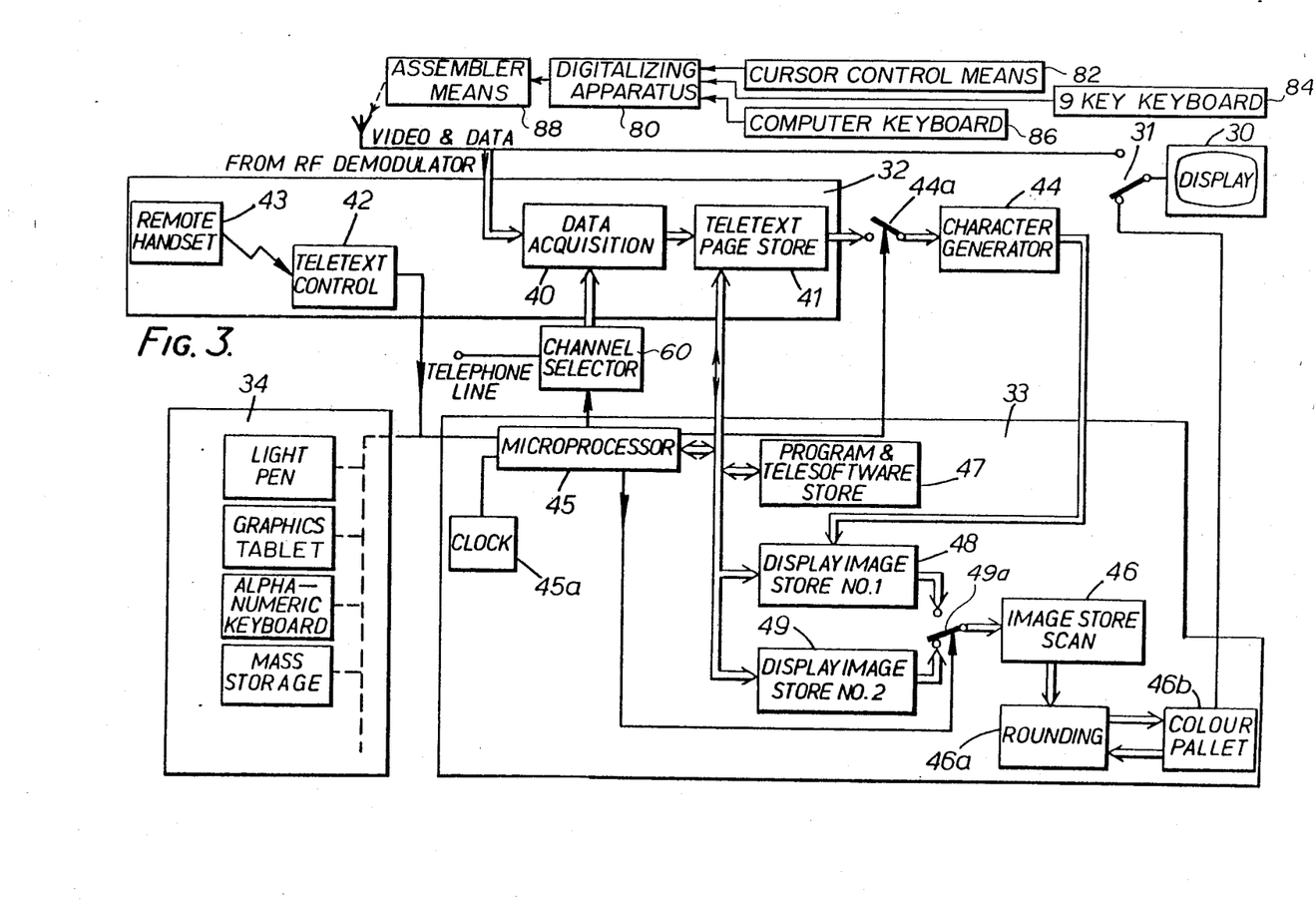
FIG. 3 shows a block diagram of a receiver including a decoder of decoding data of the form shown in FIG. 1.

Referring now to FIG. 3, the preferred receiver/decoder arrangement consists basically of a display device 30, provided with a switching arrangement 31 so as to be able to display either a normal video transmission or a Teletext transmission which is received from the usual RF demodulator, a decoder section 32 for removing the Teletext data from the video signal, an enhanced graphics section 33, and, if desired, a user section 34 to enable a user to directly make use of the enhanced graphics section and making use of a transmitted programme.

The decoder section 32 is basically the same as a conventional Teletext decoder in that it has a data acquisition circuit 40, a parallel binary storage device 41 for storing a page of Teletext data, and a control circuit 42 operated by a remote handset 43. It will therefore not be described in detail since it is largely conventional. However, the control circuit 42 does not directly control the page store 41, rather it controls a microprocessor 45 which in turn controls the storage device 41.

The arrangement is such that if normal alpha-numeric characters are to be displayed, then the microprocessor 45 will simply enable the storage device 41 to cause it to store the desired page and, using the conventional character generator 44 and an isolating switch 44a, cause the signals indicative of a desired display to be fed to an image store 48. The signals in the store 48 are read out by conventional scan and display apparatus 46. Thus, as far as the user is concerned, when in the alpha-numeric mode the receiver is functioning as before. Also, when in the normal graphics mode the apparatus will function as before. However, if the HRG identification code is received, the microprocessor 45 will alter the operation of the image production to enable HRG display. Thus, it will firstly store the incoming HRG words. This is done using either the storage device 41 alone if there is less than one page of data or using the device 41 in conjunction with one or more additional storage devices. The number of devices required is determined by the maximum number of pages of data which can be identified by the paging code. Since four bits are used to indicate the total number of pages, up to 16 storage devices may be required, each capable of storing one page of data.

Once a complete page of data is correctly received the processor commences to execute the commands contained in the HRG words, using the data contained in the arguments of the HRG words. The routines appropriate for the commands are stored in a program and telesoftware store 47.

Table 1 gives a table of the commands which are considered at present to be useful as well as the number of bits required to define what are considered to be useful numbers of options.

Of these commands, two are worthy of special attention. The first is the "chain" command number 9. This command is used to draw irregular shapes and provides an important additional facility to that provided by the "polygon" command number 4 because it reduces the number of bits that are required to be transmitted in order to draw the shape.

If one looks at the "polygon" command, the argument consists of a number of words. The first is identified by the letter C which indicates the colour of the line to be drawn. The letters $X_1$ and $Y_1$ indicate the location of the start of the line, the letters $X_2$ and $Y_2$ indicate the position to which the line is to be drawn etc. and $-1$ is a delimiter. It will be seen that each X word is an 11-bit word and each Y word is a 10-bit word. Thus, to move a short distance, say two pixels, would require 42-bits to be transmitted.

If one now considers the "chain" command, number 9, again it has the C, $X_1$ and $Y_1$ words to identify the line colour and starting position. However, the next word is "move 1". This is a 4-bit word, the first three bits of which indicate in which one of eight directions the line should move and the other bit indicates whether the move should be one or two pixels. There is thus a saving in data for a large number of short moves in different directions such as are required by a map. Chain commands are terminated by sending as the last piece of data the argument to cause a backtracking of the line drawn on the screen. This is necessary because all possible codes are used in this command.

To add extra protection to HRG words ending in a delimiter e.g. the "chain" command, a special code is transmitted as an HRG word and this code is called the continuation code in Table 1. If this code is present after a predetermined number of steps the previous command continues to be executed, if it is not the previous command is terminated.

The "chain" command is produced by means of digitizing apparatus 80 for producing digital signals representing points on, say, a curve. One way in which this can be done is to position a cursor at the start of a curve to be digitalized and put into a "chain" command using the conventional cursor control 82 provided by computers. Thereafter, the cursor is moved by one or two pixels in one of the eight directions under the control of a nine key keyboard 84, whose key depressions are digitized and stored as the data associated with the "chain" command. Alternatively, other more conventional digitalizing techniques may be used such as moving a stylus over a line drawing of the required display and noting the direction and number of pixels moved. Colour information is added to this data using the computer keyboard 86 and the whole argument is assembled by assembler means 88. The "chain" command can then be assembled in the program it is wished to transmit to a receiver and which is decoded as described hereafter.

Details of the remainder of the transmission side of the system are not given because they are largely conventional to the presently used Teletext system in this country.

The other important command is the "Delay" command number 6. This requires that the microprocessor be provided with a timing circuit or clock 45a. The "delay" command completely releases the display from the timing of the incoming data. Thus, it is possible with conventional teletext to provide a delay, but this is determined by the timing of the incoming data. With the "delay" command all the incoming data, both before and after the delay period, is received and the delay is achieved using the microprocessor. This saves on the number of pages required to be transmitted and breaks the existing relationship between transmission time and display time.

The result is that complex shapes can be drawn on the screen and yet the amount of data required to be transmitted in order to produce those shapes is less than with conventional teletext even if such shapes were possible with conventional teletext.

With this arrangement, it is possible to construct two or more display images and store each in a separate storage device e.g. store 48 or store 49 and switch between the two stores under the control of the microprocessor 45 using a switch 49a controlled by the processor 45. This would enable animation or another way to overlay one display with another to form a composite display as far as the viewer was concerned.

With this facility and the user section 34, it would be possible for a viewer to receive all the information required for a T.V. game and to play it, e.g. chess.

Figure 4:
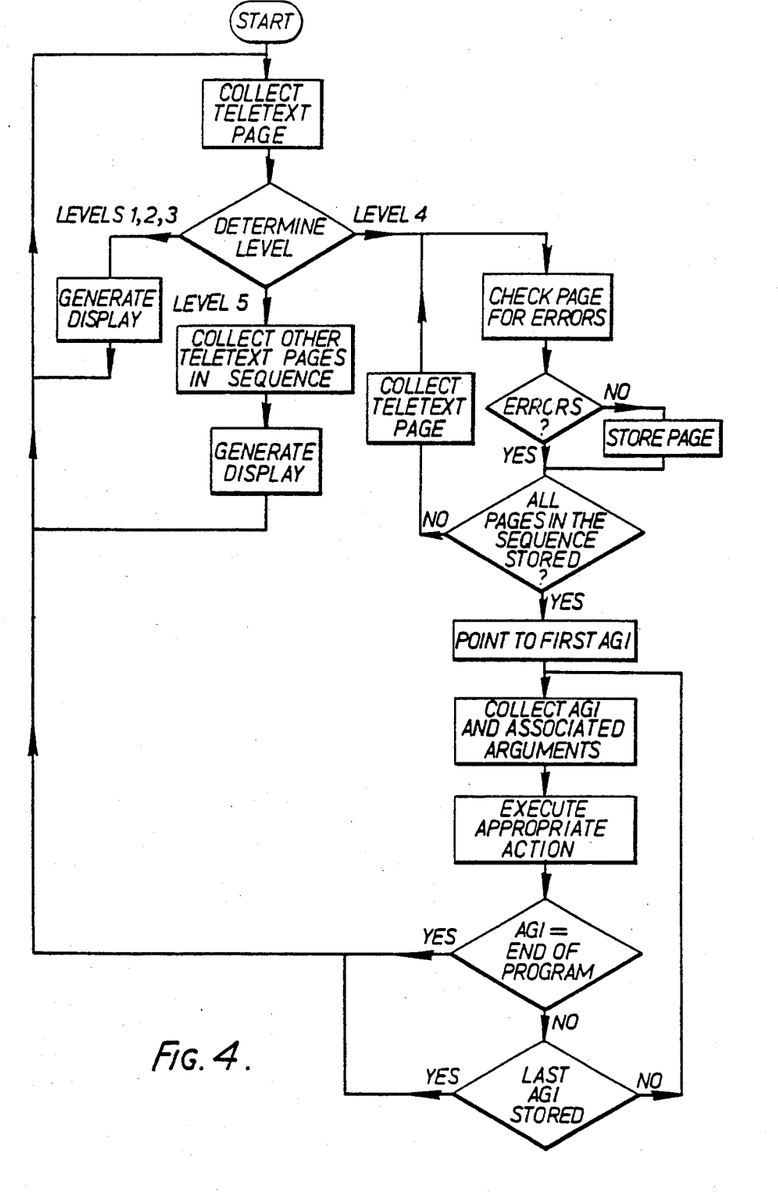
FIG. 4 shows a flow chart for the microprocessor shown in FIG. 3.

For the sake of completeness, a flow chart for the main program of the microprocessor is shown in FIG. 4. This flow chart assumes that there are five possible variations or levels all based on the conventional U.K. teletext format. Level 1 is the U.K. system as it operates at present. Level 2 adds compatibility to level 1 using the ISO range of characters and full parallel attributes so that the editor at the transmission end can change the colour or display characteristics of any character position etc. Level 3 adds dynamically redefinable character sets (DRCS) capable of producing inter alia characters which can be altered and which could be text characters or symbols as chess pieces as well as high resolution line drawings. Level 4 is the HRG system which is the subject of the present specification and level 5 adds full resolution colour pictures.

Each of the levels is indicated by an appropriate code or, in the case of level 1 by the absence of such a code. After data acquisition, the first page of data is stored in the store 41 and is monitored for the appropriate code in order to determine the level of teletext which has been transmitted. If the user has selected level 4, the first page is checked for errors by the processor summing the CRC codes present in the transmission. If there are no errors the microprocessor then checks to see if more pages are required and this, as will be recalled from above is also indicated on the first page. If no further pages are required the processor then starts to execute the commands contained in the stored page. If other pages are required, the processor continues to cause pages to be stored and checked whereupon the processor then begins to execute the commands.

Execution of the commands entails the processor accessing the program and telesoftware store 47 for the routine instructions required in order to carry out the instructed command using the data which is also contained in that HRG word. The store 47 may contain things like look-up tables for decoding various of the commands. The result of the execution of the command is fed to one of the image display stores 48 or 49. The microprocessor then checks to see if the command which it has just executed is the last command and if it is not it returns to the store 41 for the next command and executes it and so on until either it receives the "end of program" command or until it has executed the last command stored whereupon the processor resets and is available for the user to choose the next desired Teletext display.

The image display store 48 or 49 is scanned by the image store scan and display apparatus 46 to produce the signals for driving the display. Associated with the apparatus 46 are a rounding circuit 46a whose operation is described in detail with reference to FIG. 6 and a colour pellet circuit 46b which contains a look-up table for decoding the colour numbers stored in the image display store 48 or 49. The look-up table produces signals indicative of the colour as well as attribute signals i.e. signals indicative of whether the colour is a foreground or a background colour. These signals are then fed back to the rounding circuit 46a. After rounding if this is done, the colour signals which may be modified as a result of the rounding are then reapplied to the colour pallet circuit 46b whereby to produce the signals which are ultimately D/A converted and encoded for application to the display. Preferably the D/A conversion and encoding is carried out by circuitry on the colour pallet board.

The rounding operation will now be described in more detail.

The matrix of pixels adopted uses a line pair of each row of the display. The same information is output on both the odd and even field when a 625 line interlaced scan display is used. The resolution which is possible could, however, be twice this giving a less jagged appearance to any curved or angled lines.

The improved resolution could be achieved by quadrupling the size of memory which is presently used. Every one of the present sized pixels would be subdivided into four small ones each with its own four bit colour number.

An alternative method of increasing the resolution without greatly increasing the memory size is to interpolate between diagonally adjacent pixels and to position extra quarter size dots where required. The techniques have been developed for character rounding on an alpha-numeric display where the comparisons required are made upon pixel data from two character ROMs. One is configured to give the basic 'full dot' character pattern without rounding whilst the second ROM is addressed to give the same information as the display ROM but from the previous or the following line of dot information depending upon which field is being displayed.

When rounding from an image store as in the present application the reference data may be provided by using a line buffer arranged such that pixel dot information is always available from two successive lines.

Another major difference between rounding upon an image store and rounding with a character based system is the absence of a known foreground and background on the image plane. Any pixel can be independently coloured and there is no limitation of one foreground and one background colour in each character cell.

This problem has been overcome by the addition of attribute information assigned to each colour number along with its colour information and stored in the store 47. Four levels of foreground/background have been defined. When the terminal displays the contents of the image store 46, the hardware interprets the attribute data and rounds foreground colours over background colours.

It will be noted from Table 1 that is is possible to write characters with this system (see commands Ai) and A ii). The character cell of the basic image is a 10×8 matrix which appears jagged compared with the quality of commercial teletext character displays. By image plane rounding the characters are resolved on to a 20×16 matrix with a considerable improvement in appearance.

Figure 5A:
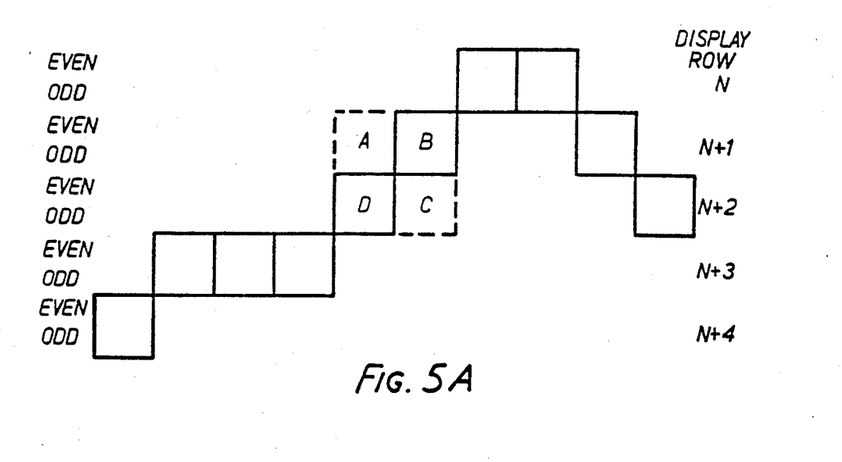
FIGS. 5A and 5B show in diagrammatic form a display before and after rounding.

FIG. 5 shows a curve produced by the "chain" code mentioned previously. FIG. 5a represents the curve as it is produced with the blocks representing pixels and the designations "odd" and "even" indicating raster scan lines of the TV display. It will be noted that where two diagonally related pixels are illuminated a very jagged result is produced.

Consider now the four pixels identified as A, B, C and D in FIG. 5a. Pixels B and D are illuminated and shown in full lines whereas pixels A and C are not illuminated and are therefore shown in broken lines.

Two different types of rounding logic may be applied to these four pixels. Firstly, diagonally adjacent pixels are tested in pairs to see if they are the same colour and to see if they are both foreground or background colours. Thus, the colour numbers for pixels A and C are compared as are the colour number for pixels B and D. Further, the attributes i.e. whether they are background or foreground colours, of the pixels A and B are compared and the following logic executed:

(i) If B=D and [B]>[A] THEN pre-round B by adding B' to pixel A (ii) If A=C and [A]>[B] THEN post-round A by adding A' to pixel B.

Where [A] is the attribute of the colour A etc.

Figure 5B:
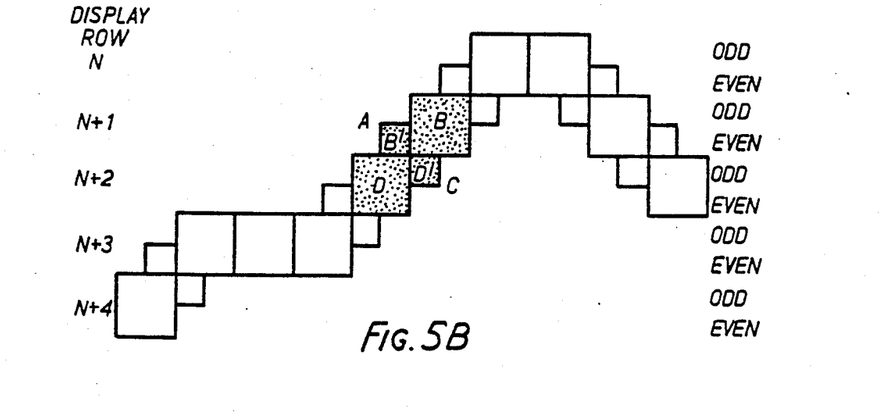

Further, if logic test (i) is executed and pixel B is prerounded as shown in FIG. 5b, it may follow automatically that D is post-rounded by adding D' to pixel C on the next field. In practice, the effect of carrying out this logic is to delay the first line of each pixel by two raster scan lines and place it after the second scan line.

The other type of rounding prohibits the automatic post-rounding D' above in the case where B=D D=C and A≠C. This prevents rounding of the inner corners of a display e.g. a square or a character "E".

The advantage of keeping corners square is apparent on text but a filled block of colour e.g. a filled circle will have a number of pixel corner groups at its perimeter which will not be fully rounded. If rounding occurs for any diagonal then rounding of filled shapes is automatic.

Figure 6:
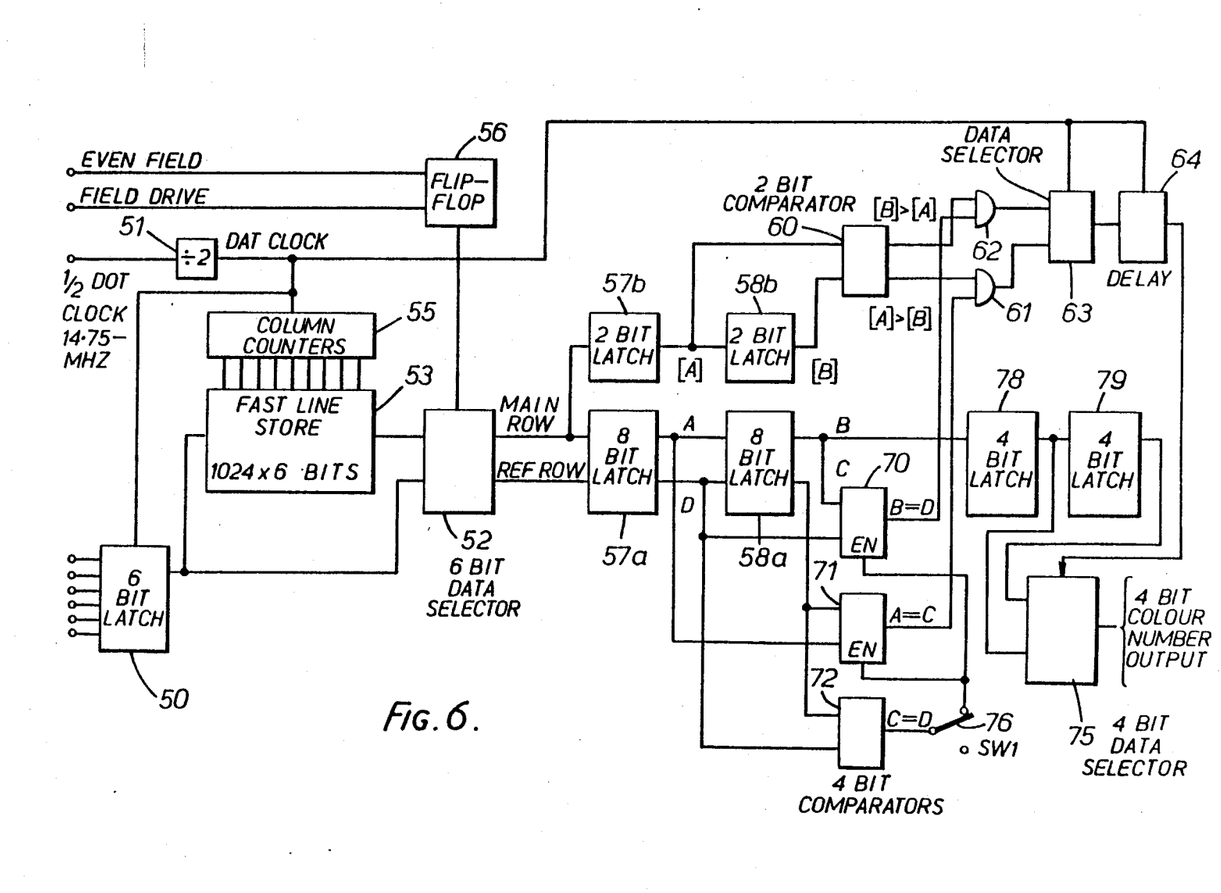
FIG. 6 shows apparatus for carrying out the rounding shown in FIG. 6.

FIG. 6 shows apparatus for carrying out the rounding described above in relation to FIGS. 5a and 5b. In this diagram it is assumed that each colour is identified by a 6-bit word, four of the bits identifying the colour itself and to remaining two bits being the attribute bits allowing two levels of background and two levels of foreground.

Words from the image store 46 are fed sequentially to a 6-bit latch 50, controlled by a clock 51 running at the horizontal pixel rate and from there to a 6-bit data selector 52 either directly or via a line store 53 capable of storing the pixels for one complete line. The store 53 is controlled by a counter 55 driven by the clock 51 and a read and then a write cycle is performed for each address location. The selector 52 is operated by a flip flop 56 and its output is fed to the combination of an 8-bit latch 57a and a 2-bit latch 57b. Thus, the output of the selector 52 comprises 4-bits representing the colour of a pixel which will be used for comparison purposes and 6-bits which form the complete word of that pixel but from one line either before or after the "ref row" pixel. Stored data is used as the "ref row" for odd fields of the interlaced picture while data coming directly from the scan and display circuit 46 is used as the "ref row" or even fields of the interlaced picture. Hence a one line shift is made upon data coming direct from the image store and the pairing for each pixel with the odd raster scan line above the even raster scan line becomes reversed. The 6-bit word from the data selector 52 is separated into its 4-bit colour number which is latched into the latch 57a and its 2-bit attribute number which is latched into the latch 57b. A further combination of latches 58a and 58b are provided so that the words representing colours of adjacent pixels in successively displayed rows are available for comparison. Operation of the selector 52 is such that information from two successive rows is input and can be crossed over so that the stored line can be displayed on the screen (during the odd field) or the line direct from the image plane can be displayed (during the even field).

The odd field requires the line ahead to be used for reference during the rounding tests whilst the even field requires the line behind the displayed line to be used. The outputs from the latches 57b and 58b are compared in a 2-bit comparator 60 and if the output from latch 57b is greater than the output from latch 58b an output signal is fed to one input of an AND-gate 61 whereas if the converse applied an output signal is fed to one input of a further AND-gate 62. Outputs of the gates 61 and 62 are fed as inputs to a data selector 63 controlled by the clock 51 and the output of the data selector 63 is delayed for timing purposes by a delay circuit 64 also controlled by the clock 51.

It will be noted that the letters A, B, C and D appear on Figures and these letters represent the pixels shown in FIGS. 5a and 5b. It is thus apparent that the comparator 60 compares the attributes of the pixels A and B and produces a control signal to indicate whether "rounding" is appropriate. The output of the latches 57a and 58a are the colour numbers for pixels A and D and B and C respectively. Three comparisons are undertaken. Firstly, the outputs from the latches 57a and 58a representing pixels B and D are compared in a 4-bit comparator 70. Likewise the colour numbers for pixels A and C and C and D are compared in 4-bit comparators 71 and 72 respectively. The output from the comparator 70 is fed as a second input to AND-gate 62 whereby if the attribute of B is greater than the attribute of A and the colour of B is equal to the colour of D pre-rounding of pixel B is appropriate and an output is produced from the AND-gate 62 and fed via the delay circuit 64 as a control signal to a 4-bit output data selector 75. Likewise the output of comparator 71 is fed as a second input to AND-gate 61 whereby if the attribute of A is greater than the attribute of B and the colour of A is the same as the colour of C then "post-rounding" of pixel A is appropriate.

The provision of the comparator 72 for comparing pixels C and D is to enable circuit to retain "not rounded" edges in case such as are described above. This selection of "rounding" or not is achieved by operation of a switch 76 which can be used to switch in the "not rounded" facility for certain cases determined by the type of display required under the control of the processor 45.

The output from the latch 58a representing pixel B is passed through two further latches 78 and 79 in series with the 4-bit data selector 75. The output of the latches 78 and 79 are fed as inputs to the selector 75.

Figure 7A:
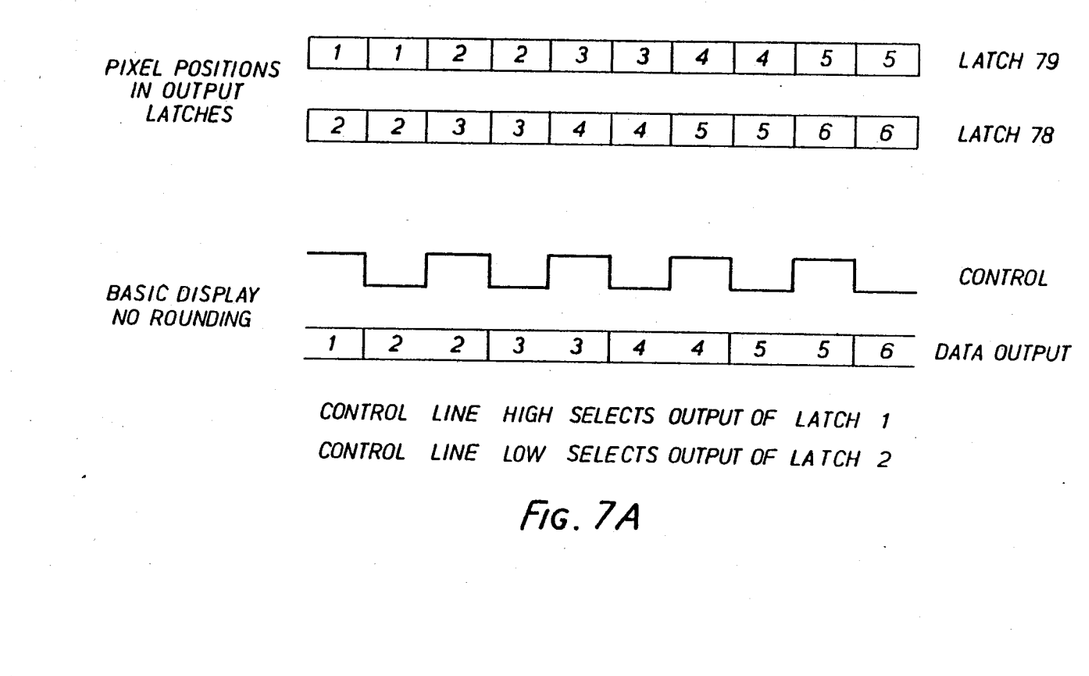
FIGS. 7A and 7B show typical control signals for part of the circuit shown in FIG. 6.
Figure 7B:
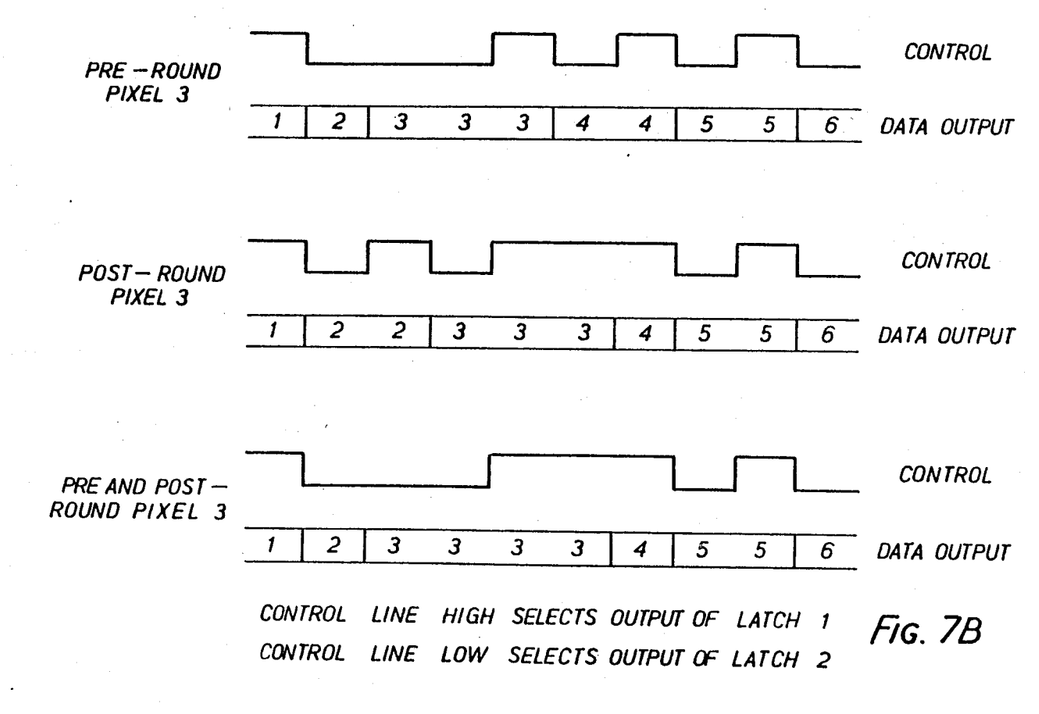

FIG. 7 shows the control sequences for the latches 78 and 79 and each pixel is indicated as being constituted by portions for ease of understanding the operation of the control signal produced by the data selector 63 and delay 64 because the delay 64 introduces a half pixel delay into the control signal timing whereby to enable pre- and/or post-rounding. The latches 78 and 79 are clocked at pixel frequency and it is not thought that further explanation is required. The output from the data selector 75 is used to provide the display.

Rounding greatly improves the appearance of text on the display by ensuring that all lines are approximately of the same intensity independent of the direction in which they are drawn and by producing smoother changes for boundaries and map outlines.

Finally, although it has been considered that the digital data will be received as part of a TV transmission it will be appreciated that alternatively the data could be received via a separate data channel such as a telephone line or other cable network with the microprocessor being used to operate a channel selector 60 to switch between data sources. In this case the data may be in a slightly different form to that described above but by using certain conventional escape sequences the data can be decoded to the same format as the codes in a page of teletext before being processed by the microprocessor to produce the picture.

We claim:

1. In a television system including input means (40) for receiving a demodulated television signal carrying, during picture-free periods thereof, a set of pages of information represented by serial binary signals provided in a repeated cycle and at least some of the binary signals representing coded instructions, the form of the cycle being such that the binary signals for the set of pages received are in groups, which groups are received each in a different one of said periods and the whole of the information for the set of pages is received during each occurrence of the cycle; a parallel binary memory device (41) connected with the input means (40) for storing binary signals representing a page of information; processing means (45) for controlling the system and connected with the input means and the parallel binary memory device; selector means (42) connected with the processing means for generating a desired page address code and activating the processing means to effect storage of the binary signals representing the page; further storage means (47) connected with the processing means and the parallel binary memory device (41) for storing a plurality of routines for use by the processing means; the processing means being arranged to access a received coded instruction in the parallel binary memory device and accessing the further storage means in order to carry out the required instruction; signal generator means (44) connected with the parallel binary memory device (41) for processing the signals stored in the parallel binary memory device to produce output signals for visual display; and display means (30) connected with the signal generator means (44) for visual display of the signals produced by the signal generator, the improvement comprising:
(a) a timer means (45a) connected with said processing means (45) for enabling the same to control the timing of the processing of the incoming coded instructions;
(b) inhibiting means (44a) connected with said signal generator means (44) and said processing means (45) and operable by said processing means to prevent operation of the said signal generator; and
(c) auxiliary storage means (48) connected with said signal generator means (44), said parallel binary memory device (41), said further storage means (47) and the said processing means (45) for receiving signals representing a visual image from at least one of the processing means, signal generator means and the parallel binary memory device, said processing means (45) and timer means (45a) being arranged to effect and control the input of signals from said at least one of the processing means (45), signal generator means (44) and parallel binary memory device to the auxiliary storage means (48), said auxiliary storage means (48) having an output connected with said display means (30), thereby to display the contents of said auxiliary storage means.

2. A system according to claim 1, wherein said auxiliary storage means comprises a plurality of storage means (48, 49), said processor means (45) and said timer means (45a) being arranged to feed signals from said plurality of storage means respectively, to a further store.

3. A system as defined in claim 1, wherein said selector means includes control circuit means (42) arranged for response to user input signals indicative of a desired display, said control circuit means (42) being connected with said processing means (45) for inputting control signals to the processing means.

4. A system according to claim 1, and further including means (46a) for interpolating between lines on a display to smooth diagonal transitions.

5. A system according to claim 4, wherein said interpolating means comprises means for delaying the signals representing one line of display, and means for comparing portions of an existing line with corresponding portions of a delayed line, thereby to produce a control signal indicative of whether interpolation should or should not take place.

6. A system according to claim 5, wherein said comparing means is arranged to compare a selected data signal representing a portion of said existing line with a delayed data signal representing an immediately diagonally adjacent portion of said delayed line.

7. A system according to claim 6, wherein said interpolating means comprises means for adding the selected data signal at a time occupied by an immediately preceding or succeeding data signal of the same line.

8. A system according to claim 1, and further comprising means for receiving further digital data in the form of binary signals from a separate channel, and channel selector means (60) for supplying to said memory device (41) said further digital data or said first-mentioned binary signals.

9. A system according to claim 8, wherein separate channel comprises a telephone line.

10. Apparatus as defined in claim 1 and further including transmitter means including transmitter processing means (80, 82, 84, 86, 88) for generating digital signals in the form of coded instructions, and for producing said coded instructions as the set of pages of binary signals, said transmitter processing means including means (80) for digitizing a curve, characterised in that said digitizing means includes means (82,84) for moving a cursor in one of the multiplicity of directions and by a distance indicative of an integer number of display locations.

* * * * *